United States Patent [19]

Sun et al.

[11] 3,761,534

[45] Sept. 25, 1973

[54] REMOVAL OF ACIDIC CONTAMINANTS FROM PROCESS STREAMS

[75] Inventors: Yun Chung Sun; Richard T. Dickerson, both of Midland, Mich.

[73] Assignee: The Dow Chemical Company, Midland, Mich.

[22] Filed: Dec. 29, 1971

[21] Appl. No.: 213,752

[52] U.S. Cl............. 260/674 A, 208/230, 208/262, 208/263, 208/284, 208/288, 260/674 R
[51] Int. Cl.................... C07c 7/00, C10g 19/00
[58] Field of Search................... 260/674 R, 674 A; 208/230, 262, 263, 284, 288

[56] References Cited
UNITED STATES PATENTS

| | | | |
|---|---|---|---|
| 3,164,545 | 1/1965 | Mattox............................... | 208/230 |
| 2,227,811 | 1/1941 | Moser................................ | 208/284 |
| 3,000,817 | 9/1961 | DeRycke et al.................... | 208/284 |
| 1,809,554 | 6/1931 | Hirt.................................... | 208/230 |
| 1,904,381 | 4/1933 | Morrell.............................. | 208/230 |
| 3,496,098 | 2/1970 | Rothe ................................ | 208/230 |
| 3,497,567 | 2/1970 | Rosenthal et al................... | 260/674 |

*Primary Examiner*—Delbert E. Gantz
*Assistant Examiner*—C. E. Spresser
*Attorney*—William M. Yates et al.

[57] ABSTRACT

Acidic contaminants such as sulfuric acid, HCl, $H_2S$, mercaptans and organic acids are efficiently removed from organic process streams by contacting the acid-containing streams with a porous granular alkali composed of 5-95 percent NaOH and 95-5 percent CaO or $Ca(OH)_2$. The process is preferably carried out by introducing the organic stream at the bottom of a column of alkali with a sump or reservoir below the bottom.

8 Claims, No Drawings

3,761,534

REMOVAL OF ACIDIC CONTAMINANTS FROM PROCESS STREAMS

BACKGROUND OF THE INVENTION

This invention relates to a chemical process, more particularly, to the neutralization of acidic contaminants in a liquid organic process stream.

Liquid organic reaction products containing acidic contaminants are frequently encountered in organic chemical processes. A familiar example is the crude effluent from an alkylation process wherein an aromatic compound is reacted with an olefin in the presence of a strong acid catalyst. Such an effluent typically contains a small but significant amount of a strong mineral acid such as sulfuric acid or hydrogen chloride. Organic acid contamination is often found in other process streams, for example, an oxidation process effluent where the desired alcohol, aldehyde, or ketone contains a corresponding acid as a principal reaction by-product. Other commonly found acidic contaminants are $H_2S$ and mercaptans, usually alkyl mercaptans, which are formed in thermal or catalytic cracking of crude hydrocarbon streams.

A common method for removing such undesirable acidic contaminants from a liquid organic effluent is washing with water or aqueous alkali. This method is relatively effective but it has serious disadvantages. Separation of the two liquid layers obtained from the washing process often involves the problem of breaking down a substantial layer of emulsified material. The washed organic layer is necessarily wet and may require a drying step. The aqueous wash can constitute a major disposal problem, for it may equal or exceed the product stream in volume.

In order to avoid some of these difficulties, organic process streams have been contacted with beds of alkaline solids such as granular magnesium oxide, calcium carbonate, or pellets of sodium hydroxide to neutralize and so remove acidic impurities. However, this method also has characteristic disadvantages. As the granular alkali reacts with the acid present in the stream, the structure of the individual granule tends to break down, the granule collapses, and the collapsed granules mat together and cause the bed to become a solid mass. Also, the salt formed in the neutralization reaction may coat the surface of the alkali and so reduce the efficiency of the bed. The salt may also fill the spaces between the alkali granules and eventually plug the bed in this manner.

SUMMARY OF THE INVENTION

It has now been found that in the method described above wherein acidic contaminants are neutralized by contacting a liquid organic stream with a solid alkali, greater efficiency and longer life for the bed of granular alkali are obtained when the alkali is an essentially homogeneous combination consisting essentially of about 5–95 parts by weight of sodium hydroxide and about 95–5 parts of calcium hydroxide, calcium oxide or mixture thereof. It has also been found that the effective life of a bed of such alkali is substantially prolonged by either or both of expedients described in detail below whereby (1) the formation of a coating of salt on the surface of the alkali is inhibited by incorporating a small amount of water-miscible alcohol in the organic stream, and (2) a sump, preferably containing water or aqueous alkali, is provided beneath a column of alkali to collect and separate the salt formed by neutralization.

DETAILED DESCRIPTION

The alkalies useful in this invention combine the properties of high porosity and good resistance to disintegration or crumbling of the granules as alkali is used up in the neutralizing process. The reason for the high physical strength and stability of these materials is not completely understood, but it is thought that the lime component may act as a binder and reinforcing agent which holds the granule together as the faster reacting sodium hydroxide is gradually reacted and reduced in proportion in the solid structure.

The range of composition of these alkalies includes soda lime in which the CaO or $Ca(OH)_2$ component predominates and the so-called glassmaker's alkali which contains a larger proportion of sodium hydroxide. These compositions can vary from physical mixtures to solid solutions and double compounds of calcium and sodium depending upon their composition and method of preparation. For example, CaO or a source of CaO such as $Ca(OH)_2$ or $CaCO_3$ may be mixed with molten NaOH or with concentrated aqueous NaOH in the desired proportion and the mixture optionally heated to a temperature which may be as high as the melting point of NaOH. When $CaCO_3$ is used as a source of lime, the final product may contain incidental quantities of the carbonate, but in all cases, it consists essentially of NaOH and CaO, $Ca(OH)_2$, or mixture thereof in a combination as described above.

The efficiency of the present process is improved and the effective life of the bed of granular alkali is lengthened by employing one or both of two modifications. In the first of these, a small amount of water-miscible alcohol is added to the organic stream to be purified. The added alcohol serves to prevent the build-up of salts on the surface of the alkali granules and thereby maintains an active alkali surface. The quantity of alcohol added to the acid-contaminated stream is not critical, since any quantity will have the desired effect to some extent, but for practical operation, about 0.5–5 percent by volume of alcohol is preferred. Operable alcohols include lower alkanols such as methanol, ethanol, and isopropyl alcohol and polyols of two to three carbon atoms such as ethylene glycol, propylene glycol and glycerol.

The other and particularly preferred modification involves the design of the apparatus in which the neutralization process is carried out. In a vertically disposed, substantially cylindrical bed of the granular alkali as it is customarily employed in the present process where the acidic stream is introduced into the bottom of the bed and passes upwardly through it, plugging of the bed by salt formed in the neutralization reaction is inhibited if there is a sump or reservoir below the bottom of the bed into which the salt can collect. The collected salt can be removed periodically or continuously as it collects by mechanical means or by flushing with water. Advantageously, the sump contains a volume of water or aqueous alkali which cannot only facilitate removal of the salt, but can also serve as a preliminary scrub to remove a portion of the acidic contaminant in the organic stream.

This latter function can be utilized to maximum effect if the organic stream is introduced below the aqueous surface and rises through the aqueous liquid before passing through the bed of solid alkali.

The process can be operated at any convenient temperature. Similarly, pressure is not a critical factor and the process is usually carried out at or slightly above atmospheric pressure.

EXAMPLE 1

Beds of 4-8 mesh granular alkalies were made up in glass tubes to a size of 3.8 cm. diameter and 15 cm. length. The tubes were held in an upright position while a stream of aromatic acid-contaminated alkylate was introduced into the top of each tube at the rate of one liquid volume per volume of alkali bed per hour by means of a metering pump. Treated alkylate was drawn off at the bottom of each bed and was analyzed periodically for acid content. The alkylate stream was tert.-butylated ethyl-benzene containing about 0.3 N total acid, the acid content being primarily sulfuric acid plus a minor amount of the aromatic sulfonic acid. The alkalies tested in this and the other examples were soda lime (about 80 percent CaO + 20 percent NaOH) and glassmaker's alkali (about 20 percent $Ca(OH)_2$ + 80 percent NaOH). A control column packed with C.P. NaOH pellets was also tested in the same way for purpose of comparison. The results are listed in Table 1.

TABLE 1

| Volumes Passed | % of Acid Removed | | |
|---|---|---|---|
| | Soda Lime | Glassmaker's Alkali | NaOH |
| 3 | 100 | 100 | 100 |
| 25 | 98 | 95 | 92 |
| 50 | 93 | 90 | 75 |
| 75 | 87 | 85 | 60 |
| 100 | 80 | 75 | 51* |

* Column of alkali had become plugged.

EXAMPLE 2

The procedure of Example 1 was repeated using a bed of the same glassmaker's alkali and the same alkylate to which had been added one percent by volume of ethyl alcohol. After 100 volumes of alkylate had been passed through the alkali bed, the bed was still removing 95 percent of the acid.

EXAMPLE 3

An oxidized process stream composed of tert.-butylphenethyl alcohol and tert.-butylacetophenone as principal components and about 1,300 p.p.m. tert.-butylbenzoic acid was passed through a bed of soda lime as described in Example 1. After passage of six liquid volumes of the stream, the treated product contained 51 p.p.m. acid, indicating 96 percent acid removal.

EXAMPLE 4

Effluent product from the alkylation of benezene with ethylene in the presence of HCl was passed through beds of soda lime and glassmaker's alkali as described in the foregoing examples. Although the effluent alkylate was saturated with HCl, the treated alkylate from each alkali bed showed no trace of remaining acid.

EXAMPLE 5

The effect of rate of flow was estimated for beds of 8-12 mesh soda lime, 8-12 mesh glassmaker's alkali, and pellets of C.P. NaOH following the procedure of Example 1. The organic stream tested was crude tert.-butylated ethyl-benzene containing 570 p.p.m. acid as $H_2SO_4$. Flows of 0.4 and 1.2 volumes of alkylate per volume of alkali bed per hour were tried and the acidity of the treated alkylate from each bed was checked at intervals. The results are summarized in Table 2.

TABLE 2

| Lbs. alkylate per lb. alkali | Percent acid removed | | | | | |
|---|---|---|---|---|---|---|
| | Soda lime | | G.M. alkali | | NaOH | |
| | 0.4 | 1.2 | 0.4 | 1.2 | 0.4 | 1.2 |
| 20 | 100 | 100 | 100 | 100 | 100 | 98 |
| 44 | 98 | 97.5 | 98 | 97 | 87.5 | 83 |
| 68 | 95 | 91 | 92 | 88 | 68 | 62 |
| 92 | 90 | 83 | 85 | 81 | (*) | (*) |
| 116 | 84 | 78 | 77.5 | 72 | | |

*Column plugged.

EXAMPLE 6

The procedure of Example 5 was repeated using as the organic stream crude tert.-butylacetophenone containing 1,300 p.p.m. tert.-butylbenzoic acid as the acid contaminant. These results are listed in Table 3.

TABLE 3

| Lbs. alkylate per lb. alkali | Percent acid removed | | | | | |
|---|---|---|---|---|---|---|
| | Soda lime | | G.M. alkali | | NaOH | |
| | 0.4 | 1.2 | 0.4 | 1.2 | 0.4 | 1.2 |
| 5 | 100 | 100 | 100 | 100 | 100 | 100 |
| 25 | 90 | 82 | 78 | 67 | 55 | 47 |
| 50 | 73 | 55 | 63 | 50 | 43 | 27 |
| 75 | 62 | 37 | 46 | 30 | 33 | 18 |
| 100 | 52 | 25 | 36 | 17 | 28 | 15 |

The type of acid-removal apparatus described in the foregoing examples has the disadvantage that on continued use, the bed of alkali gradually becomes plugged with finely divided precipitated salts. This condition can be postponed but not entirely avoided by adding lower alkanol to the organic feed stream as shown in Example 2. It was found that the deleterious effects of precipitated salts are largely prevented by introducing the acid-containing organic stream below the bottom of a bed of granular alkali supported by a grid or coarse screen with a sump or reservoir below the screen. Precipitated salts and any small fragments of alkali which may be dislodged from the main bed then fall through the bed support and collect in the reservoir. The collected solids can be removed through a drain valve periodically, or continuously if desired, by mechanical means or, preferably, by a water purge of the space. To facilitate the latter means and to provide some preliminary removal of acidic contaminant from the feed stream, a volume of water or aqueous alkali may be left in the reservoir space. Such an apparatus was used in Example 7.

Example 7

A bed of 8-12 mesh granular glass maker's alkali about 15 cm. deep was made up in a glass buret of about 3.8 cm. diameter. The bed rested on a horizontal grid about 6 cm. above the bottom drain valve. Water purge and alkylate feed inlets were located slightly below the grid while effluent alkylate was taken off through an outlet above the top of the bed of alkali.

The organic feed used was crude tert.-butylated ethylbenzene containing about 600 p.p.m. of acid calculated as sulfuric acid and the rate of flow through the bed of alkali was one volume of liquid per volume of alkali per hour. This alkylate was passed continuously through the alkali bed under these conditions for one month with acid removal of better than 90 percent. White precipitate was observed building up in the reservoir below the grid and this was periodically removed through the drain valve by a water purge. The precipitate was soluble in water and was found by analysis to be largely sodium sulfate with some sodium sulfonate. The bed of alkali remained essentially unchanged by casual observation and there was no increase in resistance to flow through it.

EXAMPLE 8

A bed of 12–18 mesh granular glassmaker's alkali was made up in a semi-plant scale apparatus similar to that of Example 7. As described in that example, a stream of hexane containing 1,100 p.p.m. ethyl mercaptan was pumped upwardly through the bed of alkali at room temperature at a rate of one volume of feed per volume of bed per hour and samples of effluent hexane were analyzed periodically to determine the continuing efficiency of the bed. Results are listed in Table 4.

TABLE 4

| Lbs. Hexane Passed Per Lb. Alkali | $C_2H_5SH$ in Product, p.p.m. | % Mercaptan Removed |
|---|---|---|
| 40 | <2 | >99.9 |
| 80 | <5 | 99.6 |
| 120 | 12 | 99 |
| 160 | 22 | 98 |
| 200 | 40 | 96 |

Example 9

The procedure of Example 8 was modified by filling the sump below the bed of alkali with 25 percent aqueous NaOH equal in volume to the bed of solid alkali. The top of the alkali solution was located a short distance below the screen supporting the bed of solid granules. Hexane containing 1,100 p.p.m ethyl mercaptan was introduced near the bottom of the column so that it passed upwardly through the alkali solution and into the bed of solid alkali, the flow rate being that used in Example 8. Samples of the effluent from the bed were analyzed for mercaptan content as before.

TABLE 5

| Lbs. Hexane Passed Per Lb. Alkali | $C_2H_5SH$ in Product p.p.m. | % Mercaptan Removed |
|---|---|---|
| 100 | <1 | <99.9 |
| 200 | <1 | <99.9 |
| 300 | 2 | 99.8 |
| 400 | 3 | 99.7 |
| 600 | 8 | 99.2 |

EXAMPLES 10-11

The procedures of Examples 8 and 9 were repeated using hexane containing $H_2S$ as the acid-contaminated feed stream. Hexane containing 200 p.p.m. $H_2S$ was passed through the column having no alkaline solution in the sump and hexane containing 300 p.p.m. $H_2S$ was used in the experiment where the sump held 25 percent aqueous sodium hydroxide. Results are summarized in Table 6.

TABLE 6

| Ex. No. | Lbs. Hexane Passed Per Lb. Alkali | $H_2S$ in Effluent p.p.m. | % $H_2S$ Removed |
|---|---|---|---|
| 10 | 100 | 1 | 99.5 |
|  | 300 | 1 | 99.5 |
|  | 450 | 2 | 99 |
|  | 500 | 6 | 97 |
|  | 600 | 12 | 94 |
| 11 | 400 | <1 | 99.7 |
|  | 800 | <1 | 99.7 |
|  | 1200 | <2 | 99.3 |
|  | 1400 | 8 | 97.3 |
|  | 1600 | 22 | 92.7 |

We claim:

1. In the method for neutralizing acidic contaminants in a water-immiscible organic liquid by contacting said liquid with a solid alkali, the improvement wherein said alkali is an essentially homogeneous combination consisting essentially of about 5–95 parts by weight of NaOH and about 95–5 parts of $Ca(OH)_2$, CaO or mixture thereof.

2. The method of claim 1 wherein the alkali is 15–85 parts of NaOH and 85–15 parts of $Ca(OH)_2$, CaO or mixture thereof.

3. The method of claim 1 wherein the organic liquid is an alkylated aromatic compound containing a small amount of a strong mineral acid.

4. The method of claim 1 wherein the acidic compound is $H_2S$ or a mercaptan.

5. The method of claim 1 wherein about 0.5–5 percent by volume of a water-miscible alcohol is added to the acid-containing organic liquid.

6. The method of claim 1 wherein the alkali forms a vertically disposed, substantially cylindrical bed of granular solid resting on a liquid-permeable support, a sump is defined below said support, the acid-contaminated organic liquid is introduced into the lower portion of said bed and passes upwardly therethrough, and solid salts formed upon contact of the acidic contaminants with the alkali are collected in said sump.

7. The process of claim 6 wherein the sump contains an aqueous liquid.

8. The process of claim 7 wherein the aqueous liquid is aqueous alkali.

* * * * *

Disclaimer 3,761,534.—*Yun Chung Sun* and *Richard T. Dickerson*, Midland, Mich. REMOVAL OF ACIDIC CONTAMINANTS FROM PROCESS STREAMS. Patent dated Sept. 25, 1973. Disclaimer filed Apr. 23, 1975, by the assignee, *The Dow Chemical Company*.

Hereby enters this disclaimer to claims 1 and 2 of said patent.

[*Official Gazette August 17, 1976.*]